United States Patent
Gyongyi et al.

(10) Patent No.: US 9,752,883 B1
(45) Date of Patent: Sep. 5, 2017

(54) USING CURRENT USER CONTEXT TO DETERMINE MAPPING CHARACTERISTICS

(71) Applicant: Google Inc., Mountain View, CA (US)

(72) Inventors: Zoltan Gyongyi, Menlo Park, CA (US); Frank Worsley, San Francisco, CA (US); Aditi Shrikumar, Sunnyvale, CA (US); Ruwen Hess, Yarrow Point, WA (US)

(73) Assignee: GOOGLE INC., Mountain View, CA (US)

( * ) Notice: Subject to any disclaimer, the term of this patent is extended or adjusted under 35 U.S.C. 154(b) by 94 days.

(21) Appl. No.: 14/296,250

(22) Filed: Jun. 4, 2014

(51) Int. Cl.
*G01C 21/34* (2006.01)
*G01C 21/32* (2006.01)
*G01C 21/36* (2006.01)
*H04W 4/00* (2009.01)

(52) U.S. Cl.
CPC ......... *G01C 21/32* (2013.01); *G01C 21/3476* (2013.01); *G01C 21/3484* (2013.01); *G01C 21/362* (2013.01); *H04W 4/00* (2013.01)

(58) Field of Classification Search
CPC ..... G06F 17/30699; H04W 4/02; H04W 4/00; G01C 21/3641; G01C 21/32; G01C 21/3476; G01C 21/3484
USPC ..................... 701/409; 455/456.3; 705/14.58
See application file for complete search history.

(56) References Cited

U.S. PATENT DOCUMENTS

| | | | |
|---|---|---|---|
| 8,108,778 B2 | 1/2012 | Athsani et al. | |
| 8,583,668 B2 | 11/2013 | Higgins et al. | |
| 8,600,619 B2 | 12/2013 | Bales et al. | |
| 2010/0083169 A1* | 4/2010 | Athsani | H04M 1/72522 715/810 |
| 2011/0050732 A1* | 3/2011 | Arrasvuori | G06F 17/30241 345/666 |
| 2012/0185419 A1* | 7/2012 | Kuhn | H04M 1/72569 706/12 |
| 2012/0253935 A1* | 10/2012 | Blom | G06Q 30/00 705/14.58 |
| 2013/0095857 A1* | 4/2013 | Garcia | H04W 4/02 455/456.3 |
| 2013/0345957 A1 | 12/2013 | Yang et al. | |
| 2014/0287779 A1* | 9/2014 | O'Keefe | H04W 4/02 455/456.3 |
| 2014/0344688 A1* | 11/2014 | Kulick | G06F 3/0482 715/716 |
| 2015/0100237 A1* | 4/2015 | Zhao | G01C 21/3641 701/532 |
| 2015/0242496 A1* | 8/2015 | Schlesinger | G06F 17/30699 707/722 |

FOREIGN PATENT DOCUMENTS

| | | |
|---|---|---|
| WO | 03032106 | 4/2003 |
| WO | 2013020075 | 7/2013 |
| WO | 2013184249 | 12/2013 |

* cited by examiner

*Primary Examiner* — Isaac Smith

(74) *Attorney, Agent, or Firm* — Middleton Reutlinger

(57) ABSTRACT

Methods and apparatus related to determining one or more mapping characteristics of a map based on a current context of a user. A current context of a user may be identified and one or more mapping characteristics determined based on the current context. A map that is responsive to a mapping request of the user may be tailored to include the determined mapping characteristics.

12 Claims, 6 Drawing Sheets

• Flight Confirmation

To: joe@exampleurl.com (Joe)
From: booking@exampleairline.com

Joe,
 The following information is regarding your recently booked flight:

Tickets: 2 adults, 1 child ← 205

---

Departing Flight:

Departs: LAX
Time: April 30, 2014 7:30 am

Arrives: SFO ← 210
Time: April 30, 2014 9:00 am

Returning Flight:

Departs: SFO
Time: May 1, 2014 10:30 am

Arrives: LAX ← 215
Time: May 1, 2014 12:00 pm

FIG. 2

USING CURRENT USER CONTEXT TO DETERMINE MAPPING CHARACTERISTICS

BACKGROUND

A user may submit a mapping request that indicates a geographic area of interest. The user may be provided with a map that is responsive to the request and may include a geographic area. For example, a user may submit a mapping request for a geographic location of interest and be provided with a map that includes the geographic location of interest and one or more other geographic areas.

SUMMARY

The present disclosure is generally directed to methods and apparatus for determining characteristics of a map based on context. For example, implementations of the disclosure are directed to methods and apparatus to identify a current context of a user that is indicative of a current state of the user and determine, based on the current context, one or more mapping characteristics for a map that is responsive to a mapping request of the user. Determining mapping characteristics based on the current context of the user tailors the map to the user's current context, which may result in a map that is more relevant to the user and/or that may be utilized by the user more efficiently and/or with less cognitive load.

In some implementations, the current context of the user may be determined based on one or more documents that are associated with the user. In some implementations, the current context of the user may be determined based on an indication of co-presence of the user with one or more other individuals. In some implementations, the current context of the user may be determined based on a previously determined context of the user. For example, the previously determined context of the user may be utilized as the current context based on an association between the previously determined context and one or more current attributes such as a current date/time and/or a current location of the user. In some implementations, the one or more mapping characteristics that may be determined based on the current context of the user may relate to one or more of, for example, a view port, a map style, selection or omission of points of interest, density of points of interest, display characteristics of points of interest, user interface styles, and/or user interface controls. Examples of mapping characteristics are described in more detail herein.

As one example, a geographic area of a map may be determined based on a mapping request of the user and a current context of the user may be identified that indicates the user is on a trip. Based on the identified current context, mapping characteristics may be determined that include a low density of points of interest and that include high level labels of one or more neighborhoods in the geographic area (e.g., words or symbols indicating the neighborhoods and/or outlines or other demarcations indicating the neighborhoods). The map may be tailored to include the mapping characteristics and the map may be provided to the user. Providing the map with a low density of points of interest and the high level labels may enable, for example, more efficient orientation to the geographic area by the user.

In some implementations, a method is provided that includes the steps of: receiving a mapping request for a user, wherein the mapping request includes an indication of one or more geographic areas of interest; determining a geographic area of a map based at least in part on the indication of the one or more geographic areas of interest; identifying a current context of the user, wherein the current context is determined based at least in part on one or more documents associated with the user and is indicative of a current state of one or more dynamic states associated with the user; determining one or more mapping characteristics of the geographic area based on the current context of the user; tailoring the map to include the determined mapping characteristics of the geographic area; and providing, responsive to the mapping request, the map with the one or more mapping characteristics of the geographic area.

This method and other implementations of technology disclosed herein may each optionally include one or more of the following features.

The one or more mapping characteristics may include one or more high level labels for the geographic area and the step of determining the mapping characteristics may include determining whether to display the one or more high level labels based on the current context of the user.

The current context may be indicative of the current state of one or more of the dynamic states of: an activity of the user, a familiarity measure of the user with the geographic area, and other individuals with the user. The step of identifying the current context of the user may further include the steps of: identifying one or more of a current time and a current location associated with the user; and identifying the current context based on association of the current context with one or more of a time related to the current time and a location related to the current location. The method may further include the step of determining the current context based on the one or more documents.

The step of determining the current context based on the one or more documents may include the steps of: determining a context based on content of the one or more documents; determining one or more context attributes associated with the context, wherein the context attributes include one or more of: a context time associated with the context and a context location associated with the context; and identifying the context as the current context based on similarity between at least one of the one or more context attributes and one or more current attributes associated with the user. The step of determining the context based on the content of the one or more documents may include the steps of: extracting features from the content; providing the features to a context classifier; and receiving an indication of the context from the context classifier. The one or more attributes associated with the context may be determined based on the content of the one or more documents.

The current state of the activity of the user may be indicative of one of: a business trip, a vacation, a mode of transportation, and a task. The current state of the user may be identified based on a distance between a location where the user is performing a task and a familiar location of the user. The mode of transportation may be selected from a group including: driving, walking, biking, and public transportation.

The step of determining at least one of the one or more mapping characteristics may be further based on a condition at the geographic area. The condition may be at least one of: a weather condition at the geographic area, a current time at the geographic area, and a current day at the geographic area.

The one or more mapping characteristics may include a granularity of display of one or more terrain features. The terrain features may include at least one of roads and waterways. The current context may be indicative of the current state of a familiarity measure of the user with the geographic area; and the step of determining the granularity of display of the terrain features may include determining the granularity based on a magnitude of the familiarity measure.

The one or more documents may include one or more of messages and Internet accessible documents associated with the user.

The current state of the user may be indicative of other individuals with the user, the mapping characteristic may be related to a point of interest, and the step of determining the mapping characteristic may include selecting the point of interest based on a relationship of the point of interest with the other individuals with the user.

In some implementations, a method is provided and includes the steps of: receiving a mapping request for a user, wherein the mapping request includes an indication of one or more geographic areas of interest; determining a geographic area of a map based at least in part on the indication of the one or more geographic areas of interest; identifying an indication of one or more other individuals with the user; determining one or more mapping characteristics of the geographic area based on the indication of the one or more other individuals with the user; tailoring the map to include the determined mapping characteristics of the geographic area; and providing, responsive to the mapping request, the map with the one or more mapping characteristics of the geographic area.

This method and other implementations of technology disclosed herein may each optionally include one or more of the following features.

The mapping characteristic may be related to a point of interest and the step of determining the mapping characteristic may include determining the point of interest based on a relationship of the point of interest with the indication of the one or more other individuals with the user.

The step of identifying the indication of the one or more other individuals with the user may include the steps of: identifying one or more of a current time and a current location associated with the user; and identifying the indication of the one or more other individuals based on association of the indication with one or more of a time related to the current time and a location related to the current location. The method may further include: determining the indication of the one or more other individuals based on content of one or more documents associated with the user; determining one or more of the time and the location based on the content; and associating the indication of the one or more other individuals with the one or more of the time and the location.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein determine a mapping characteristic for a map that is responsive to a mapping request of a user based on an identified current context of the user. In some implementations, the current context may be determined based at least in part on one or more documents that are associated with the user. The current context may be indicative of a current state of one or more dynamic states associated with the user. In some implementations, the current context may be indicative of co-presence of the user with one or more individuals.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2 is an illustration of a sample message that includes content that may be utilized to determine a current context of a user.

DETAILED DESCRIPTION

Figure 1:
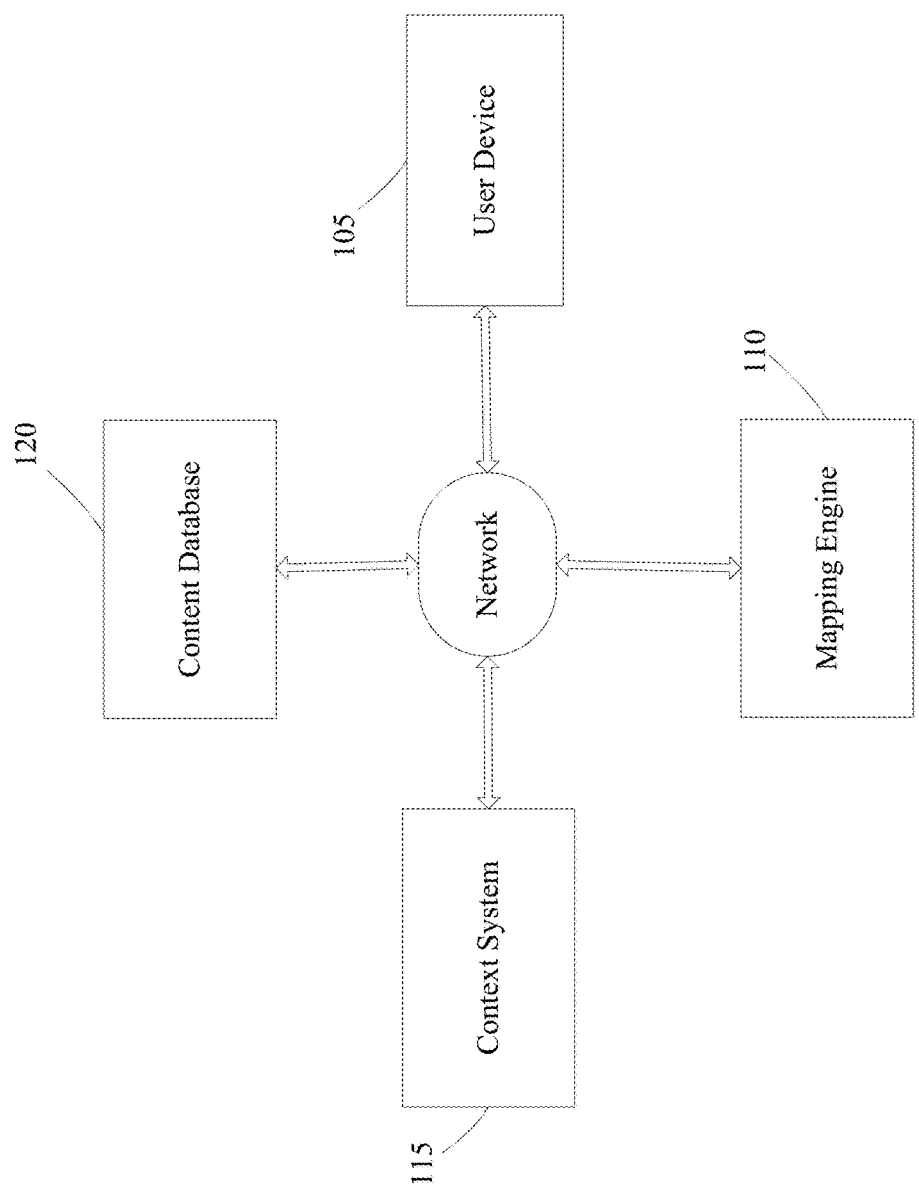
FIG. 1 is a block diagram of an example environment in which one or more mapping characteristics of a geographic area of a map may be determined based on a current context of a user.

A user may submit a mapping request that indicates one or more geographic areas of interest and the user may be provided with a map that includes a geographic area determined based on the indicated geographic areas of interest of the mapping request. The provided map may be tailored to include one or more mapping characteristics determined based on a current context of the user. As one example, a current context of the user may indicate the user is unfamiliar with the geographic area that is included in the map and one or more mapping characteristics may be determined based on the indicated lack of familiarity. For example, the mapping characteristics may include abstracting one or more aspects of the geographic area to a generalized view and/or not displaying particular streets such as side streets and/or other streets of minor importance. The map may be tailored to include the mapping characteristics and therefore display the geographic area to the user in a manner that is more useful for a person that is unfamiliar with the geographic area. For example, the map tailored to include the mapping characteristics may enable quicker orientation of the user to the geographic area when viewing the tailored map than when viewing a map that did not include the generalized view of the aspects of the geographic area and/or that included the particular side streets omitted from the tailored map.

As another example, a current context of the user may indicate the user is on vacation and one or more mapping characteristics may be determined based on the current context. For example, determining the mapping characteristics may include selecting one or more points of interest, such as tourist attractions, that would not be provided if the current context was instead indicative of being on a business trip. Also, for example, determining the mapping characteristics may include determining a display prominence of a tourist attraction point of interest, that is more prominent than the display prominence for the point of interest would be if the current context was instead indicative of being on a business trip.

Determining mapping characteristics based on the current context of a user tailors the map to the user's current context, which may result in a map that is more relevant to the user and/or that may be utilized by the user more efficiently and/or with less cognitive load. As will be understood from description herein, determining mapping characteristics based on the current context of a user may potentially lead to significantly different maps being provided to different users for the same geographic area. Also, determining mapping characteristics based on the current context of a user may potentially lead to a first map being provided to the user for a geographic area under a first context of the user and a second different map being provided to the same user for the same geographic area under a second context.

In some implementations, the current context of a user may be determined based on one or more documents that are associated with the user. For example, an email of a user that includes confirmation of a flight may be utilized to determine a context indicative of being on a trip based on content of the e-mail such as one or more terms of the e-mail (e.g., the subject of the e-mail; the sender of the e-mail; dates, times, and/or airport locations in the body of the e-mail). The context that is indicative of being on a trip may optionally be associated with one or more context attributes to enable identification of when that context is the current context of the user. For example, one or more context attributes may be determined based on the e-mail such as one or more: dates/times of the trip (e.g., based on a departure date and a return date) and/or geographic areas of the trip (e.g., based on geographic areas near the destination airport). Such one or more context attributes may be associated with the context and the context may be identified as the current context based on matching one or more current attributes associated with a mapping request of the user with the one or more context attributes associated with the context. For example, a mapping request of a user may be received on a date/time that is associated with the date/time context attributes and a geographic area may be determined based on the mapping request that is proximate to, or the same as, a geographic area associated with the context attributes. Based on the date/time and/or the determined geographic area matching the context attributes of the context, the context may be identified as the current context of the user. Additional and/or alternative documents associated with a user may be utilized to determine a context of a user and/or one or more context attributes for a determined context. For example, calendar entries of the user, instant messages of the user, web history of the user, task entries of the user, and/or one or more additional documents that are associated with the user may be utilized, singularly or in combination, to determine a context of a user and/or one or more context attributes for a determined context.

In some implementations, a current context of a user may be indicative of co-presence of the user with one or more other individuals. For example, location data of the user and location data of one or more individuals associated with the user, such as contacts of the user, may be utilized to determine that the user and one or more individuals are present together at a location. The current context may reflect such a determination. For example, the current context may indicate generally that the user is with other individuals and/or may indicate more specific context based on information related to the other individuals. For example, in some implementations the current context may indicate a class of the other individuals relative to the user (e.g., friends, family, co-workers) and mapping characteristics may be determined to tailor a provided map specifically for co-presence with the identified class of individuals. For example a first set of mapping characteristics may be determined for a current context that indicates a user is traveling with family members and a second set of mapping characteristics may be determined for a user that is traveling with business associates. For example, the different mapping characteristics may include different restaurant points of interest based on whether the user is travelling with family members or business associates. In some implementations where the current context of a user is indicative of co-presence of the user with one or more other individuals, the current context may be based on one or more documents associated with the user. For example, a calendar entry of a user may be for a "family vacation" for a certain date range. The current context of the user on a date during that date range may be determined based on matching the date to the date range of the calendar entry and determining the calendar entry is indicative of being on a vacation with family members.

FIG. 1 illustrates a block diagram of an example environment in which one or more mapping characteristics of a geographic area of a map may be determined based on a current context of a user. The example environment includes a communication network 101 that facilitates communication between the various components in the environment. In some implementations, the communication network 101 may include the Internet, one or more intranets, and/or one or more bus subsystems. The communication network 101 may optionally utilize one or more standard communications technologies, protocols, and/or inter-process communication techniques. The example environment also includes a user device 105, a mapping engine 110, a context system 115, and a content database 120. The user device 105 may execute one or more applications, such as a web browser and/or a mapping application.

Figure 6:
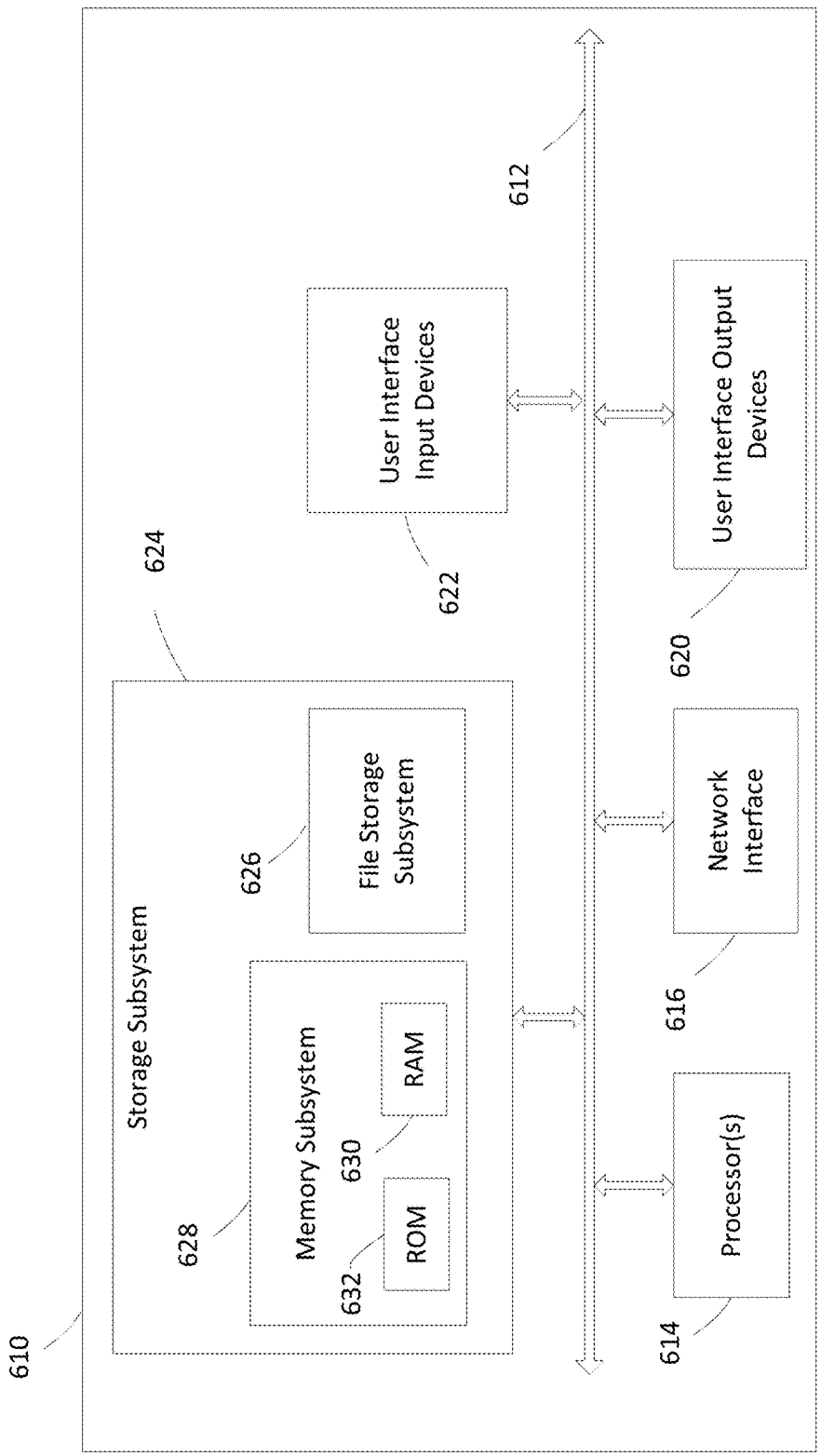
FIG. 6 illustrates a block diagram of an example computer system.

The user device 105, the mapping engine 110, the context system 115, and/or one or more additional components of the example environment of FIG. 1 may each include memory for storage of data and software applications, a processor for accessing data and executing applications, and components that facilitate communication over a network. In some implementations, the components may include hardware that shares one or more characteristics with the example computer system that is illustrated in FIG. 6.

In this specification, the term "database" will be used broadly to refer to any collection of data. The data of the database does not need to be structured in any particular way, or structured at all, and it can be stored on storage devices in one or more locations. Thus, for example, the database may include multiple collections of data, each of which may be organized and accessed differently. Also, in this specification, the term "entry" will be used broadly to refer to any mapping of a plurality of associated information items. A single entry need not be present in a single storage device and may include pointers or other indications of information items that may be present on other storage devices. For example, an entry may include multiple nodes mapped to one another, with each node including an identifier of an entity or other information item that may be present in another data structure and/or another storage medium.

In some implementations, content database 120 may include one or more storage media and may be utilized to store and/or access one or more aspects of information described herein. For example, content database 120 may be utilized by one or more components to store, modify, and/or access content from one or more documents associated with a user. Also, for example, content database 120 may be utilized by one or more components to store, modify, and/or access one or more determined contexts for a user, times associated with contexts, locations associated with contexts, and/or other individuals associated with contexts, as described herein. In some implementations, the content database 120 may store content and/or sources of multiple users, and, for each entry, access to the source and/or content may be allowed only for the user and/or one or more other users or components authorized by the user, such as context system 115 and/or mapping engine 110. In some other implementations, the content database 120 may store only content and/or sources for a single user.

In some implementations, a mapping request may be provided to mapping engine 110 via one or more components. A provided mapping request may include an indication of one or more geographic areas of interest. For example, a mapping request may be provided via user device 105 in response to input of a user (e.g., spoken, typed, and/or selected) that specifies a geographic area of interest as, for example, a street address, a zip code, longitude and latitude coordinates, a descriptor of a point of interest, and/or an identifier of a selected geographic area on a map. In some implementations, a geographic area of interest included in a mapping request may not be based on explicit input from the user. For example, a mapping request may be provided to mapping engine 110 with the current location of the user as the geographic area of interest when the user initially accesses a mapping application that is executing on user device 105. Based on the provided mapping request, mapping engine 110 may provide a map with a geographic area determined based on the geographic area of interest that was indicated by the mapping request. For example, referring to FIG. 4A, an example graphical user interface for displaying a provided map to a user is illustrated. Map 400A displays a geographic area. The user may be provided map 400A via user device 105 in response to a mapping request that includes an indication of a geographic area of interest that is included in map 400A, such as a mapping request that includes point of interest 405A as a geographic area of interest. For example, a mapping request may include the address of point of interest 405A, an intersection of "Main Street and 3$^{rd}$ Street," longitude and latitude coordinates, and/or the user may otherwise indicate point of interest 405A. The map 400A displays a geographic area that includes point of interest 405A and one or more streets that are proximate to point of interest 405A. For example, map 400A includes "Main Street", "Broadway", etc.

In some implementations, mapping engine 110 may identify a geographic area based on the geographic area of interest indicated in a mapping request. For example, mapping engine 110 may identify a mapping of the geographic area of interest to a geographic area and/or one or more points of interest that are proximate to the geographic area of interest. In some implementations, mapping engine 110 may determine a map that includes the geographic area of interest and one or more geographic areas that are within a threshold distance from the geographic area of interest. For example, for a mapping request that includes "123 S. Main Street" as a geographic area of interest, mapping engine 110 may identify geographic areas within one mile of "123 S. Main Street" and determine a map that is centered at "123 S. Main Street" and includes the identified geographic area. In some implementations, a geographic area of interest of a mapping request may include the location of the user and one or more terms included in the mapping request and mapping engine 110 may determine a geographic area based on the location of the user and the one or more terms. For example, an indication of a geographic area of interest may include user input of "Downtown" and a location of the user; and mapping engine 110 may determine an area of the closest "Downtown" as the geographic area (e.g., the downtown area of the city that is closest to the user). Also, for example, an indication of a geographic area of interest may include user input of "restaurants near me" and the location of the user; and mapping engine 110 may determine a geographic area that includes one or more restaurants near the user.

Mapping engine 110 may also determine mapping characteristics of a geographic area that is responsive to the mapping request of the user. As described herein, one or more of the mapping characteristics may be determined based on an identified current context of the user. In some implementations, mapping engine 110 may identify a current context of a user via one or more components. A current context of a user may be indicative of a current state of one or more dynamic states associated with the user. For example, dynamic states associated with a user may include a familiarity measure of the user that changes based on the user's location, the date/time, and/or other factors; an activity of the user that changes based on the user's location, the date/time, and/or other factors; and/or other individuals with the user that changes based on the user's location, the date/time, etc. A current context of a user indicates a current state of one or more of such dynamic states. For example, a current context may be indicative of whether the user is on a business trip, a familiarity measure of the user with a geographic area, and/or whether the user is traveling with other individuals.

As described herein, in some implementations, a context may be determined for a user and one or more context attributes such as a date, time, and/or location may be associated with the context. The context may be identified as the current context based on matching one or more current attributes associated with a mapping request of the user with the one or more context attributes. For example, a context of a user being on a trip may be associated with a particular date and the context of being on a trip may be identified as the current context of the user when the current state of the date is the associated particular date. In some implementations, a current context of a user may be indicative of an activity that the user is currently engaging in. For example, a current context of a user may indicate that the user in currently in a meeting and/or that the user is currently traveling. Also, for example, a current context of a user may be indicative of a mode of transportation that is currently being utilized by the user, such as a current context that is indicative of walking, driving a car, taking public transportation, and/or flying.

Mapping engine 110 may utilize an identified current context of a user to determine one or more mapping characteristics, tailor a map with the one or more mapping characteristics, and provide the map to the user. For example, mapping engine 110 may request a current context for a user from a context system 115. Based on the identified current context, mapping engine 110 may determine one or more mapping characteristics of a map that are responsive to the mapping request, tailor the map to include the mapping characteristics, and provide the tailored map to the user. For example, mapping engine 110 may identify the current context of a user as traveling on vacation and determine a mapping characteristic of a geographic area based on the identified current context of being on vacation (e.g., showing one or more geographic areas with a high level label, determining prominence for a point of interest, and/or determining to show and/or not show one or more points of interest).

In some implementations, context system 115 may identify documents that are associated with a user and utilize the documents to determine a context of the user. Documents may include, for example, emails, instant messages, previously accessed internet documents, web history, calendar entries, images that are embedded with metadata (e.g., metadata that identifies a location at which the images were taken), and/or records of previous locations of the user. In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used. In some implementations, context system 115 may identify documents with certain data that has been treated one or more ways to remove personal identifiable information and/or other information.

In some implementations, context system 115 may identify a current context of a user and provide mapping engine 110 with the current context. For example, a current context of the user may indicate: the user's familiarity with one or more geographic areas; if the user is on a business trip and/or on a vacation; if the user is traveling with other individuals; one or more features associated with a habitual activity in which the user is engaged (or is about to engage); and/or one or more other contexts that indicate the current state of one or more dynamic states that are associated with the user. In some implementations, context system 115 may determine a context of a user for a future date/time and store the context with the associated date/time in content database 120 for future use. In other words, a context for a user may be determined that is associated with a future date/time and the context may be identified as the current context at the future date/time. In some implementations, context system 115 may additionally and/or alternatively associate a location with a context, store the location with the context in content database 120, and provide the context as the current context of the user when the user is determined to be at the location and/or when a mapping request is provided that indicates a geographic area of interest that is the location (or that results in a geographic area being determined that includes the location) and/or is associated with the location (e.g., a geographic area of interest that is a member of the location). In some implementations, a context may be associated with one or more individuals and the context may be provided as the current context when presence of the user is identified with the one or more individuals based on one or more signals.

In some implementations, context system 115 may utilize a rules-based approach to determine a context based on one or more signals. Signals may include, for example, text from one or more documents associated with the user such as text from user emails and/or user-accessed web documents, location data of the user, location data of one or more other individuals, and/or search history of the user. For example, context system 115 may identify an airport designation "LAX" in an email from an airline as conforming to one or more rules that identify an airport code and may utilize "LAX" to determine a destination of a trip (e.g., an address in Los Angeles that is mapped to LAX, a lat/long mapped to LAX that is within the city boundaries of Los Angeles, and/or an entity identifier of Los Angeles mapped to LAX). Also, for example, context system 115 may identify "Apr. 30, 2014" in the same email as conforming to one or more rules that identify a date and further identify that "Apr. 30, 2014" is associated with LAX based on one or more rules such as a rule that considers proximity of "Apr. 30, 2014" to "LAX" in the e-mail. Context system 115 may determine that the user is on a trip in the Los Angeles area on April 30 based on a rule that determines that a date and an associated airport designation are indicative of a user being on a trip in the area around a designated airport on the identified date.

For example, referring to FIG. 2, an illustration is provided of a sample message that includes content that may be utilized to determine a current context of a user. Email 200 is a document that may be associated with a user and is an email sent to the user from a booking department of an airline. In some implementations, context system 115 may determine a document is trustworthy before determining a current context from the document. For example, context system 115 may determine the email 200 is trustworthy based on the email address of the sender of email 200 being an identified trustworthy source. The email address may be identified as trustworthy based on, for example, the email address being a contact of the user, another relationship between the user and the e-mail address, and/or based on a curated or otherwise determined list of trustworthy sources). Also, for example, context system 115 may determine that a document that was created by the user contains information that is trustworthy. Also, for example, context system 115 may not utilize a document to identify the current context of the user based on determining that the document was sent to the user from a source that is not trustworthy, such as a source that is known to send spam messages.

Email 200 includes a message 205 from an airline as the sender of the message. The message 205 indicates that that information contained in the email 200 is related to an airline flight. Additionally, message 205 includes an indication of the number of passengers that are associated with the flight information (i.e., "2 adults, 1 child"). Departing flight information 210 and returning flight information 215 include dates, times, and airports for flights.

In some implementations, context system 115 may utilize information from email 200 to determine a current context based on identifying that email 200 includes airline information. For example, context system 115 may determine that, based on the departing flight information 210 and returning flight information 215, the user will be traveling between Apr. 30, 2014 and May 1, 2014 based on identifying those dates as the departing and returning flight dates. Also, for example, context system 115 may determine that the user is traveling with additional people based on identifying "2 adults, 1 child" as indicative of additional passengers with the user on the departing and returning flights.

Figure 3:
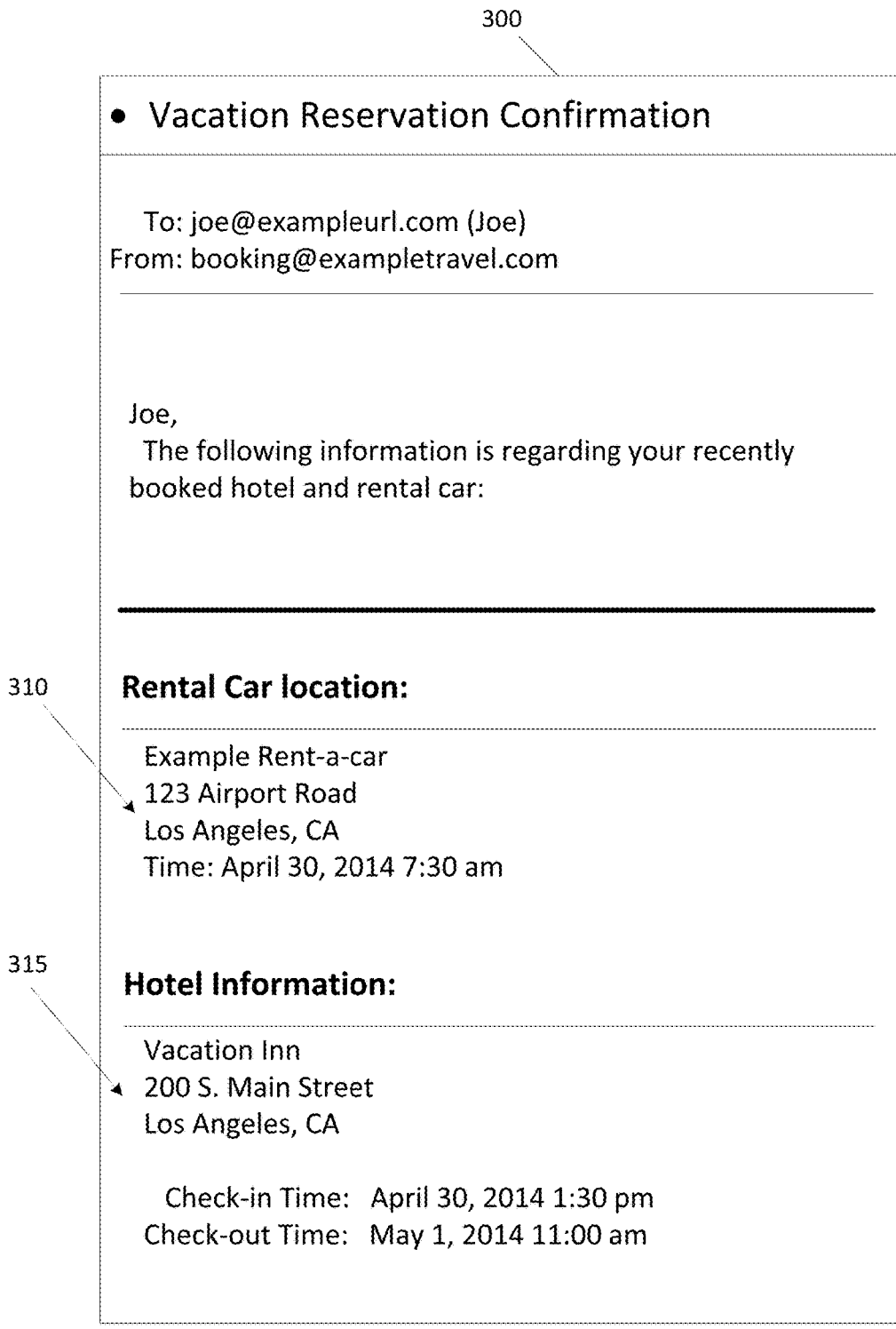
FIG. 3 is an illustration of another sample message that includes content that may be utilized to determine a current context of a user.

Referring to FIG. 3, an illustration of another sample message that includes content that may be utilized to determine a current context of a user is provided. Email 300 includes hotel information 310 and rental car information 315, which include dates and addresses that are associated with reservations of the user. In some implementations, context system 115 may determine a current context for the user at a future date/time based on information in email 300. For example, context system 115 may identify that the user is not usually located near the addresses in rental car information 315 and/or hotel information 310 and utilize that information to determine that the user is traveling at the time of the reservations (i.e., April 30 and May 1).

In some implementations, context system 115 may determine current context based on email 200 and/or the email 300 utilizing a classifier based approach. For example, context system 115 may include a classifier trained to identify if one or more segments of a document is indicative of a context based on the one or more segments and/or additional signals of the source. For example, context system 115 may classify a term in an email as indicative of a context (either a current context or a future context that will eventually be a current context) based on one or more signals from the content of the email, such as signals related to the term itself, signals related to one or more terms before and/or after the term, signals related to the position of the term in the email, and/or signals related to metadata of the email. One or more signals may optionally include signals based on processing of the document by one or more additional components. For example, signals may include signals related to parts of speech of one or more terms, syntactic relationships of one or more terms, etc. and such signals may be based on output of a parser. In some implementations, one or more signals may be determined based on one or more rules and the signals may be utilized in a classifier approach. A classifier of context system 115 may be trained to classify segments as related to a context based on previous training utilizing supervised or semi-supervised training techniques. Additional or alternative rules-based and/or classifier-based techniques may be utilized to determine a context from content of a document. For example, in some implementations, one or more features may be determined from content of documents utilizing one or more rules and provided to a classifier as signals to determine a context of the user.

In some implementations, context system 115 may determine from one or more documents that the user is engaging in an activity and provide mapping engine 110 with the current activity as a current context. For example, context system 115 may determine that a context of a user being on a business trip based on identifying a flight of a user, a departing flight date, and a returning flight date from an email. An indication of the activity of being on the business trip may be provided as the current context of the user for mapping requests that are received between the departing flight date and the returning flight date. Also, for example, context system 115 may determine that a user is on a business trip based on identifying an indication of the business trip in a calendar entry of the user. As another example of an activity that may be indicated by a current context of a user, a current context indicative of a shopping task may be determined for a user based on an identifying a shopping list and/or a reminder created by the user that is related to shopping and/or based on the user being located at or near a shopping location. Also, for example, a current context indicative of an activity of a user looking for a restaurant may be determined based on one or more search terms that were submitted by the user that are related to dinner and/or based on the user submitting a mapping request close to a meal time.

As an example, referring to FIG. 2, context system 115 may determine that the user is planning to travel to Los Angeles between April 30 and May 1 based on departing flight information 210 and returning flight information 215. Based on indications in the message 205 of the user flying with a child and another adult (information 205), context system 115 may determine that the user is going on a vacation. Additionally and/or alternatively, context system 115 may identify previous web search history that includes searches for tourist attractions, a calendar entry of the user that indicates that the user is not planning to be at work between April 30 and May 1, and/or one or more other features of documents that are indicative of the user being on vacation.

In some implementations, context system 115 may determine that the user is engaging in an activity at or near a location that is familiar to the user and provide the mapping engine 110 with an indication of performing the activity near a familiar location as a current context. For example, context system 115 may determine a "home" location for a user as a familiar location and determine that the user is performing an activity near a familiar location based on determining that the user is performing the activity within a threshold distance of a familiar location (the "home" location). Examples of performing activities near a familiar location may include traveling near a familiar location (e.g., traveling between "home" and a work location), visiting a friend near a familiar location (e.g., near "home" or near another familiar location), and/or grocery shopping near a familiar location (e.g., near "home" or near another familiar location).

In some implementations, the current context of a user may be indicative of co-presence of the user with other individuals. For example, referring to FIG. 2, message 205 includes the terms "2 adults, 1 child." Context system 115 may determine a context that the user will be traveling with other individuals for the duration of the determined trip. Also, for example, context system 115 may determine that the user is on vacation based on determining that one is the other individuals is a child. Other indications that a user is traveling with other individuals include calendar entries that include a name of another individual, social media check-ins of other contacts of a user within a threshold distance of the user, and/or other indications of the presence of one or more individuals with the user for a threshold amount of time. For example, one or more contacts of a user may check-in at an airport location within a threshold amount of time of a check-in of the user and subsequently check-in at a second airport within a threshold amount of time of a check-in of the user. Context system 115 may determine that the user is traveling with the other individuals based on identifying that the other individuals and the user have indicated that they have been co-present at two airports within a threshold amount of time (i.e., the user and the other individuals have traveled from the first airport to the second airport).

In some implementations, the current context of a user may be indicative of a familiarity measure of the user with the geographic area of interest indicated in a mapping request and/or the geographic area determined based on the geographic area of interest. In some implementations, a familiarity measure be expressed as a numeric or alphabetical value along a range, e.g., from zero to one. In some implementations, a familiarity measure may be expressed in a binary fashion, e.g., as positive (e.g., "familiar") or negative (e.g., "not familiar"). As one example, mapping engine 110 may provide context system 115 with an indication of one or more geographic areas, such as the geographic area determined based on a mapping request, and context system 115 may identify a familiarity measure for the geographic area that indicates that the user is familiar with the geographic area. The familiarity measure for the geographic area may be determined by the context system 115 and/or other component based on one or more signals that are indicative of familiarity of the user with the geographic area. For example, context system 115 may determine the familiarity measure based on identifying the user has previously visited the geographic area and/or that the user has frequently visited geographic area(s) near the geographic area based on location data and/or other data of the user. As another example, a familiarity measure that indicates that the user is not familiar with one or more geographic areas may be based on determining that the user has not been identified at the geographic areas and/or nearby geographic areas, has not been in the geographic areas and/or nearby geographic areas frequently, and/or that the user has not visited the geographic areas and/or nearby geographic areas within a threshold length of time (e.g., the user has not been identified within a threshold distance of the geographic areas for a year or more).

In some implementations, context system 115 or other component may determine a familiarity measure of a user with a geographic area based on explicit input of the user. For example, context system 115 may determine a familiarity measure for a location that is highly indicative of familiarity based on the user having indicated the geographic area as a "home" location and/or a "work" location (i.e., likely a familiar area to the user). In some implementations, context system 115 may determine a familiarity measure of a user with a geographic area based on a quantity of references and/or frequency of references to the geographic area and/or items associated with the geographic area (e.g., points of interest) in messages or other documents associated with the user. For example, context system 115 may identify multiple messages of the user that each confirm reservations related to a geographic area on a different date (e.g., messages confirming hotel and/or flight reservations for a monthly or other periodic business trip). Based on the multiple messages that confirm reservations related to the geographic area, context system 115 may determine a familiarity measure that is indicative of the user being familiar with the geographic area.

In some implementations, a current context of a user may be indicative of a mode of transportation that is currently being utilized by the user. For example, context system 115 may identify a car rental confirmation and a current context for a user may indicate that the user is traveling by car at the time of the mapping request. Also, for example, a current context of a user traveling by car may be determined based on identifying that the mapping request was provided to mapping engine 110 from an area that is indicative of a road and/or other indications that the user is in a car, such as signals provided by one or more sensors of user device 105 (e.g., GPS or other location sensor, motions sensor), and/or based on an indication that the user device 105 is in communication with a computing device of a car (e.g., paired via Bluetooth). Also, for example, a current context of a user may be that the user is biking based on determining that the current location of a user is near biking trails. Also, for example, a current context of a user may be that the user is utilizing public transportation based on determining that the user is traveling on a public transportation route from location data of the user and/or other signals that are indicative of public transportation travel. Also, for example, a current context of walking may be determined for a user based on identifying that the user is traveling along a route at a speed that is indicative of walking and/or based on other signals (e.g., based on motion sensor(s) of a mobile computing device of the user). Similarly, a current context of biking may be determined for a user based on identifying signals indicating the user is traveling along a street at a speed that is indicative of riding a bicycle and/or based on other signals.

In some implementations, the current context of a user may be indicative of one or more features associated with a habitual activity in which the user is engaged (or is about to engage). For example, context system 115 or another component may determine that a user is engaged in a habitual activity based on matching one or more current attributes associated with the user with one or more context attributes associated with the habitual activity; and one or more features associated with the determined habitual activity, such as an activity type of the habitual activity, may be indicative of the current context of the user. As one example, one or more documents of a user may be indicative of a user visiting a point of interest and/or a type of point interest on a weekly basis, such as email confirmations for restaurant reservations for multiple Friday evenings within a time period (e.g., three out of four of the last Fridays, 8 pm reservations on multiple Fridays). In some implementations, a habitual activity of visiting restaurants on Friday evenings may be determined based on such documents and/or other signals associated with a user. A current context of a user on a Friday evening may be determined based on the habitual activity by matching the current date and time (Friday evening) with the context attributes of the habitual activity. For example, the current context may be indicative of the user visiting or looking for restaurants. One or more mapping characteristics may be determined based on the current context. For example, determining mapping characteristics based on the current context may include selecting restaurant points of interest for display and/or for display with greater prominence.

Context system 115 may determine a current context for a user and provide the current context to mapping engine 110. Mapping engine 110 may utilize the current context to determine one or more mapping characteristics of a map to provide to the user. A mapping characteristic includes one or more indications that may be utilized to tailor one or more features of a map. In some implementations, determining the one or more mapping characteristics that may be determined based on the current context of the user may include determining a view port such as a zoom level of a map and/or where the map is centered. For example, a current context that indicates a high degree of familiarity with an area may result in a closer zoom level than a current context that indicates little or no familiarity with an area. In some implementations, determining the one or more mapping characteristics may include determining a map style such as whether one or more features are displayed and/or how one or more features are displayed. For example, a current context that indicates little or no familiarity with an area may result in high level labels being displayed for an area along with low amounts of detail for the area (e.g., displaying minimal and/or no terrain features), whereas a current context that indicates a high degree of familiarity with the area may result in no high level labels being displayed for the area and a greater saturation of detail for the area. In some implementations, determining the one or more mapping characteristics may include selecting or omitting points of interest, determining a density of points of interest, and/or determining display characteristics of points of interest. For example, a current context that indicates a user is on a trip in an unfamiliar area may result in a relatively low density of points of interest being displayed with more popular and/or touristy points of interest being selected for display and/or displayed with greater prominence, whereas a current context that indicates a high degree of familiarity with the area may result in a greater density of points of interest and/or a different set of points of interest being selected for display.

In some implementations, determining the one or more mapping characteristics may include determining one or more user interface styles such as how the map is provided for presentation on the user device 105 and/or which items are included for presentation in combination with the map. For example, a current context that indicates a user is on a trip in an unfamiliar area may result in a larger map being displayed than a current context that indicates a high degree of familiarity with the area. Also, for example, determining whether and/or which off-map point of interest indicators are displayed may be based on the current context. An off-map point of interest indicator is generally information related to a point of interest that is displayed in combination with the map, but not on their location on the map (e.g., above the map or on a sidebar). Also, for example, determining whether and/or which area is displayed on an inset map may be based on the current context. An inset map might show a detailed part of a map at a larger scale, or the extent of the existing map drawn at a smaller scale within the context of a larger area. In some implementations, determining the one or more mapping characteristics may include determining which user interface controls are provided and/or content of those user interface controls. For example, rankings of query suggestions that are provided for a search field provided with the map user interface may be influenced based on the current context. Also, for example, one or more query suggestions may be pre-populated or "pushed" to the user for presentation via the search field (e.g., via a drop down menu associated with the search field).

Figure 4A:
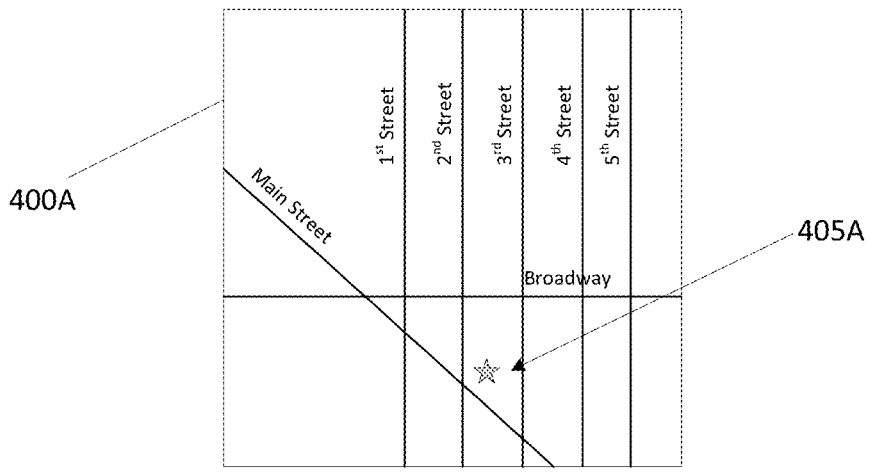
FIG. 4A is an example graphical user interface for displaying a provided map to a user.

As one example, referring to FIG. 4A, map 400A may be tailored based on one or more determined mapping characteristics. In some implementations, map 400A map be provided to a user via one or more applications that are executing on user device 105, such as a mapping application. Map 400A includes a point of interest 405A. In some implementations, point of interest 405A may be provided as a geographic area of interest in a mapping request. For example, a user may provide mapping engine 110 with "3rd and Main," "350 S. Main Street," and/or indicate the location via a provided map as a mapping request (e.g., selecting a location on an interactive map). In some implementations, mapping engine 110 may determine one or more mapping characteristics and tailor map 400A based on a determined current context of a user. For example, mapping engine 110 may have determined a mapping characteristic to include all streets within a vicinity of point of interest 405A based on identifying the level of familiarity of the user with the geographic area. In some implementations, a map may be tailored with a mapping characteristic to include all streets and/or all major streets in a geographic area based on a current context that the user is familiar with the area.

In some implementations, point of interest 405A may not be the geographic area of interest of a mapping request and mapping engine 110 may instead determine the point of interest 405A as a mapping characteristic based on an identified current context of a user and/or content from one or more documents. For example, a user may provide "Downtown" as a geographic area of interest to mapping engine 110 and mapping engine 110 may identify that the user is familiar with "Downtown" and further determine that the user has a dinner reservation at "350 S. Main Street." Mapping engine 110 may determine mapping characteristics to include major streets and include an indication of the restaurant that has been identified as the restaurant where the user has reservations at a time that is proximate to the current date/time. Mapping engine 110 may tailor a map of the geographic area with the determined mapping characteristics and provide map 400A to the user in response to the mapping request of "Downtown."

In some implementations, mapping engine 110 may determine a mapping characteristic of a high level label for one or more geographic areas of a map. For example, context system 115 may determine that a user is unfamiliar with a geographic area that is included in a mapping request and mapping engine 110 may determine a mapping characteristic of neighborhood names for one or more areas that are included on the map. Also, for example, a mapping characteristic may be determined such that areas that are indicated with high level labels are not provided with one or more terrain features, such as roads, waterways, points of interest, and/or other terrain features within the areas.

Figure 4B:
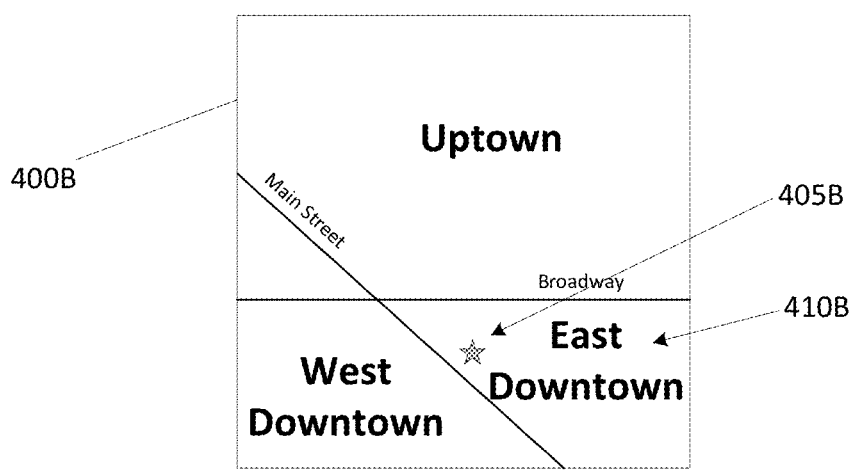
FIG. 4B is an example graphical user interface for displaying a provided map that includes high level label mapping characteristics determined based on a current context.

For example, referring to FIG. 4B, an example graphical user interface for displaying a provided map with geographic areas of interest indicated with high level labels is illustrated. In some implementations, map 400B may be based on a similar and/or the same mapping request from the user as the mapping request that resulted in the user being provided map 400A (e.g., the address of point of interest 405B) but with a different determined current context for the user. For example, the user may provide a mapping request of "Downtown" to context system 115 and context system 115 may determine that "Downtown" is unfamiliar to the user based on one or more techniques described herein. Instead of providing the map with a granularity of streets that includes "$1^{st}$ Street," "$2^{nd}$ Street," etc., as in map 400A, mapping engine 110 may determine a mapping characteristic where only major streets, like "Main Street" and "Broadway," are included and high level labels for neighborhoods, such as label 410B.

Figure 4C:
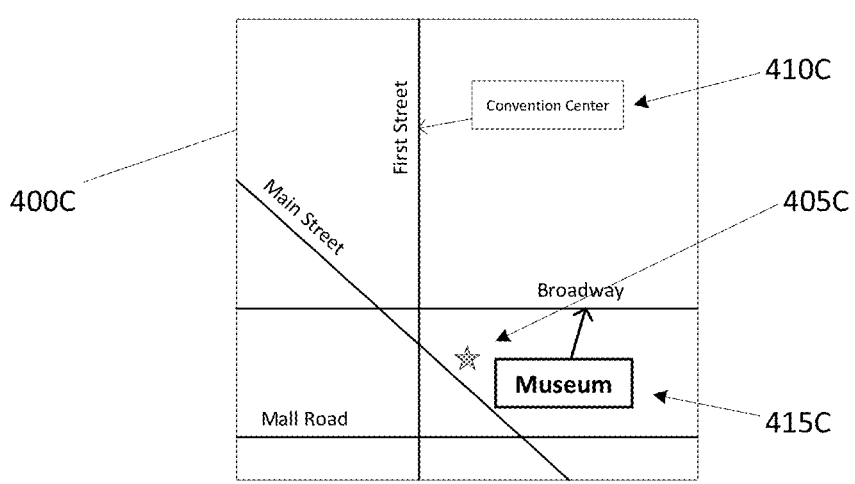
FIG. 4C is example graphical user interface for displaying a provided map with points of interest mapping characteristics determined based on a current context.

Referring to FIG. 4C, an example graphical user interface for displaying a provided map with points of interest determined based on mapping characteristics is illustrated. In some implementations, map 400C may be provided to a user based on the same and/or a similar mapping request as map 400A and 400B. For example, map 400C may be provided to a user based on a mapping request that includes "Downtown" and/or "350 Main Street." In some implementations, point of interest 405C may be a geographic area of interest that is included in a mapping request, as described herein with respect to point of interest 405A and point of interest 405B. In some implementations, map 400C may be provided with mapping characteristics that were determined based on a current context that the user is on vacation. For example, mapping characteristics may be indicative of a user providing a mapping request for an unfamiliar area. Map 400C includes a convention center indication 410C and a museum indication 415C. On the provided map, museum indication 415C is provided more prominently than convention center indication 410C. In some implementations, the prominence of museum indication 415C may be determined based on a current context that the user is on vacation (e.g., the user may likely have more interest in a museum than a convention center while on vacation). In some alternative implementations, a user may have a current context indicative of being on a business trip and convention center indication 410C may be more prominent (e.g., the user may have more interest in a convention center than a museum while on a business trip).

In some implementations, map 400A, map 400B, and/or map 400C may not be provided with a point of interest, but still be provided with one or more of the mapping characteristics as described herein. For example, the user may access a mapping application and be provided with a map that is centered at the current location of the user or other location and that does not include a point of interest. Such a map may be provided with one or more mapping characteristics determined based on a current context as described herein, such as a mapping characteristic of high level labeling for one or more geographic areas.

In some implementations, the mapping characteristics of map 400A, map 400B, and/or map 400C may be determined based on different and/or additional current contexts of the user than the current contexts described herein with respect to maps 400A, 400B, and 400C. For example, map 400A may be provided to a user with a current context that is indicative of unfamiliarity of a geographic area, a user with a current context of being on a business trip, and/or a current context of being on a vacation.

In some implementations, additional and/or alternative mapping characteristics may be determined for maps 400A, 400B, and/or 400C and/or other maps. For example, a mapping characteristic for a geographic area may include a color, font, icon, and/or other feature for a point of interest and/or for other item of the geographic area to distinguish the point of interest and/or other item from other portions of the geographic area. Also, for example, one or more points of interest may be provided with additional and/or alternate features than one or more other points of interest, such as a point of interest being provided with other information related to the point of interest (e.g., operating hours for an attraction, contact information for a business). Also, for example, a mapping characteristic of a geographic area may include providing contact information for a point of interest that is likely of interest to the user and not providing contact information for a second point of interest that is less likely of interest to the user. In some implementations, multiple maps may be provided to the user with different mapping characteristics for each map. For example, an insert map may be simultaneously provided with a main map (e.g., overlaid on the map) that shows one or more geographic areas with different mapping characteristics than the main map and/or with a different granularity (e.g., high level labels, zoomed into a particular geographic area).

In some implementations, a mapping characteristic may be further determined based on a current condition of one or more geographic areas and/or points of interest. For example, in some implementations a mapping characteristic that is a point of interest may be selected only when the corresponding location is open for business. Also, for example, a mapping characteristic may be further determined based on a weather condition at the location. For example, a current context of a user may be that the user is on vacation and an outdoor tourist attraction may be provided as a mapping characteristic only when the weather is conducive to visiting the location, such as when the temperature is above 75 and/or when it is not raining. Also, for example, indoor activities may be provided and/or provided more prominently if an identified weather forecast at the location indicates a likely chance of rain.

In some implementations, one or more mapping characteristics may be utilized to tailor a map for a user from a standard basemap of a geographic area. For example, mapping engine 110 may identify a basemap for a geographic area that includes standard indications of features (e.g., streets, terrain, points of interest). In some implementations, the basemap may be tailored to include the one or more determined mapping characteristics. For example, mapping engine 110 may determine a mapping characteristic that includes providing high level labels for one or more portions of a geographic area, tailor the basemap by overlaying high level labels on the basemap, and provide the tailored map to the user. In some implementations, tailoring the map with mapping characteristics may include removing one or more features of the standard basemap. For example, mapping engine 110 may determine a mapping characteristic that includes not displaying one or more secondary streets, tailor the basemap by removing one or more secondary streets from the basemap, and provide the tailored map to the user. In some implementations, portions of the provided map not affected by the mapping characteristics may be provided in substantially the same form as those portions on the basemap. For example, a street that is not affected by a mapping characteristic may be provided on a tailored map in the same manner as the street would be provided on the basemap.

In some implementations, one or more mapping characteristics may be utilized to generate a personalized map for a user that is not necessarily tailored from a standard basemap. For example, mapping engine 110 may determine mapping characteristics for a map based on the current context of the user and generate a new map that is specific to that user and that current context. In some implementations, a minimal number of features may be determined for a map and mapping engine 110 may tailor the minimal map by overlaying one or more mapping characteristics. For example, mapping engine 110 may determine a mapping characteristic that includes one or more points of interest, determine a map that includes the one or more points of interest and one or more streets near the one or more points of interest, and provide the user with the determined map. Also, for example, mapping engine 110 may determine a mapping characteristic that includes only high level labels for neighborhoods of a city, determine a map that only includes the high level labels and boundaries of the neighborhoods, and provide the user with the map. Also, for example, mapping engine 110 may determine a mapping characteristic that includes points of interest that are personal to the user, determine a map that includes only those personal points of interest, and provide the user with the map.

Figure 5:
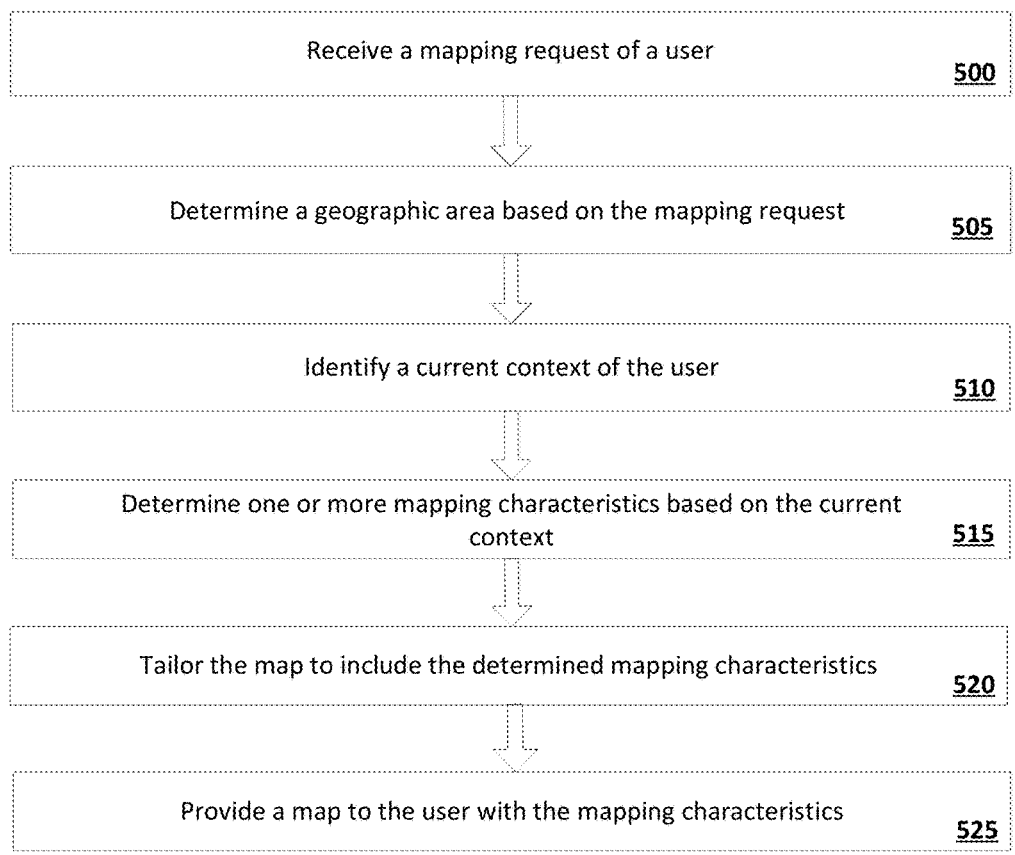
FIG. 5 is a flowchart illustrating an example method of determining one or more mapping characteristics of a geographic area based on a current context of a user.

Referring to FIG. 5, a flowchart is provided illustrating an example method of determining mapping characteristics of a map based on current context of a user. Other implementations may perform the steps in a different order, omit certain steps, and/or perform different and/or additional steps than those illustrated in FIG. 5. For convenience, aspects of FIG. 5 will be described with reference to one or more components of FIG. 1 that may perform the method, such as the mapping engine 110 and/or context system 115.

At step 500, a mapping request is received. In some implementations, the mapping request may be provided in response to input provided by the user via user device 105.

In some implementations, the mapping request may be provided by one or more components that are associated with the user. For example, the mapping request may be provided to mapping engine 110 by user device 105 when the user accesses a mapping application that is executing on user device 105. In some implementations, the mapping request may include an indication of one or more geographic areas of interest. For example, a mapping request may include an address, a general location, an intersection of streets, and/or an indication of a location via an interactive map. The indication of the geographic area of interest may be provided, for example, by the user and/or identified based on location data of the user, such as a mapping request that includes the identified current location of the user.

At step 505, a geographic area is determined based on the mapping request. For example, the geographic area may be determined based on an indication of a geographic area of interest in the mapping request. In some of those implementations, the geographic area may include the geographic area of interest that was indicated in the mapping request and one or more additional geographic areas. For example, a mapping request may include the geographic area of interest "350 S. Main Street" and mapping engine 110 may determine a geographic area that includes "350 S. Main Street" and one or more other locations. Also, for example, a mapping request may include a location of a computing device initiating the mapping request as the indication of the geographic area of interest and mapping engine 110 may determine a geographic area determined based on that location. For instance, the geographic area may be centered on that location or determined based on that location and another indication of the geographic area of interest in the mapping request (e.g., one or more terms of the mapping request). In some implementations, the geographic area may be centered on the geographic area of interest that was included in the mapping request. For example, mapping engine 110 may receive a mapping request that includes "350 S. Main Street" and may determine a map that is centered at "350 S. Main Street" and includes one or more geographic areas within one mile of "350 S. Main Street."

At step 510, a current context of a user is identified. In some implementations, mapping engine 110 may determine a current context of the user from context system 115. In some implementations, context system 115 may determine a current context for the user based on features from one or more documents. For example, context system 115 may determine one or more contexts based on content of one or more emails, instant messages, calendar entries, and/or other documents of a user. A context determined based on one or more documents may be associated with one or more context attributes such as dates, times, other individuals, and/or locations that are identified, for example, based on content of the one or more documents. Mapping engine 110 may request a current context from the context system 115. Context system 115 may determine the current context of the user based on identifying a context with one or more context attributes in common with a current time, date, and/or a location associated with the user, and provide the current context to mapping engine 110. In some implementations, a current context of a user may be indicative of co-presence of the user with one or more other individuals. In some implementations, a current context may be determined based on identifying one or more individuals that are traveling with the user. For example, context system 115 may determine a current context of a user traveling on vacation based on identifying flight information for multiple family members and/or based on location data of one or more individuals that is indicative of being located with the user.

At step 515, one or more mapping characteristics are determined based on the current context. For example, a mapping characteristic of providing one or more geographic areas of a map with high level labels and not providing one or more secondary streets may be determined based on identifying a current context that is indicative of a user being unfamiliar with the geographic area. Also, for example, mapping engine 110 may determine a mapping characteristic of providing a point of interest with a greater prominence based on determining that a user with the identified current context is more likely interested in the point of interest than one or more other points of interest.

At step 520, the determined map is tailored to include the mapping characteristics. In some implementations, mapping engine 110 may utilize the mapping characteristics to determine how one or more features of a map will be provided to the user. For example, based on the mapping characteristics, one or more features on a map may be added or removed from the map to reflect the determined mapping characteristics. Also, for example, one or more features on a map may be tailored to be displayed more or less prominently based on the determined mapping characteristics. Also, for example, one or more features and/or geographic areas may be provided with a high level label and not displayed with one or more terrain features.

At step 525, the map is provided with the mapping characteristics. In some implementations, the map may be provided by a component that shares one or more characteristics with mapping engine 110 and provided for display to a user via user device 105. In some implementations, the map may be provided with the geographic feature of interest that was provided with the mapping request. For example, the user may provide a geographic point of interest of "350 S. Main Street" and the provided map may be centered at "350 S. Main Street" and/or an indication of "350 S. Main Street" may be provided on the map.

In some implementations, all or aspects of the mapping engine 110, the context system 115, and/or the content database 120 may be incorporated on the user device 105. For example, a current context for a user may be determined, by a component that is separate from user device 105, based on one or more documents from a remote database and the current context may be provided to the mapping engine 110 that may be executing, in whole or in part, on user device 105. Also, for example, one or more aspects of a current context of a user may be determined from data stored on user device 105 by a component that shares one or more characteristics with context system 115 and that is executing, in whole or in part, on user device 105. Also, for example, a current context may be determined for a user by a context system executing on a device separate from user device 105, the current context may be provided to a second context system executing on user device 105, and the second context system may update and/or adjust the current context based on data stored on user device 105.

In some implementations, all or aspects of the mapping engine 110 may be incorporated on the user device 105 and/or on a component that is separate from user device 105. For example, one or more mapping characteristics may be determined by a first mapping engine 110 executing separately from user device 105, and provided to a second mapping engine 110 executing on user device 105, which may determine additional and/or alternate mapping characteristics based on the current context of the user or other factors. In some implementations all or aspects of mapping engine 110 and/or context system 115 may be combined.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory subsystem 625 and a file storage subsystem 626, user interface input devices 622, user interface output devices 620, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to determine a mapping characteristic of a map based on a current context of a user. As another example, the storage subsystem 624 may include the logic to determine a current context of a user based on features from one or more documents that are associated with the user.

These software modules are generally executed by processor 614 alone or in combination with other processors. Memory 625 used in the storage subsystem can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be optionally stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer implemented method, comprising:
receiving a mapping request for a user, wherein the mapping request includes an indication of one or more geographic areas of interest;
determining a geographic area of a map based at least in part on the indication of the one or more geographic areas of interest, the geographic area defining a zoom level of the map, and the map to be provided in response to the mapping request;
determining a context of the user based on content of a document sent to the user, determining the context of the user comprising:
determining, based on the content of the document sent to the user, a point of interest for the context and a context date or context time associated with the point of interest;
identifying the context as a current context of the user based on receiving the mapping request at a current date or current time that matches the context date or context time;
determining one or more mapping characteristics of the geographic area based on the current context of the user, wherein determining the one or more mapping characteristics includes determining a granularity of display, for the geographic area of the map, of the point of interest based on the current context;
tailoring the map to include the determined mapping characteristics of the geographic area; and
providing, responsive to the mapping request, the map of the geographic area with the one or more mapping characteristics of the geographic area.

2. A system including memory and one or more processors operable to execute instructions stored in memory, comprising instructions to:

receive a mapping request for a user, wherein the mapping request includes an indication of one or more geographic areas of interest;

determine a geographic area of a map based at least in part on the indication of the one or more geographic areas of interest, the geographic area defining a zoom level of the map, and the map to be provided in response to the mapping request;

determine a context of the user based on content of a document sent to the user, wherein the instructions to determine the context of the user include instruction to:

determine, based on the content of the document sent to the user, a point of interest for the context and a context date or context time associated with the point of interest;

identify the context as a current context of the user based on receiving the mapping request at a current date or current time that matches the context date or context time;

determine one or more mapping characteristics of the geographic area based on the current context of the user, wherein the instructions to determine the one or more mapping characteristics include instructions to determine a granularity of display, for the geographic area of the map, of the point of interest based on the current context;

tailor the map to include the determined mapping characteristics of the geographic area; and provide, responsive to the mapping request, the map of the geographic area with the one or more mapping characteristics of the geographic area.

3. A non-transitory computer readable storage medium storing instructions executable by a processor, the instructions including instructions to:

receive a mapping request for a user, wherein the mapping request includes an indication of one or more geographic areas of interest;

determine a geographic area of a map based at least in part on the indication of the one or more geographic areas of interest, the geographic area defining a zoom level of the map, and the map to be provided in response to the mapping request;

determine a context of the user based on content of a document sent to the user, wherein the instructions to determine the context of the user include instruction to:

determine, based on the content of the document sent to the user, a point of interest for the context and a context date or context time associated with the point of interest;

identify the context as a current context of the user based on receiving the mapping request at a current date or current time that matches the context date or context time;

determine one or more mapping characteristics of the geographic area based on the current context of the user, wherein the instructions to determine the one or more mapping characteristics include instructions to determine a granularity of display, for the geographic area of the map, of the point of interest based on the current context;

tailor the map to include the determined mapping characteristics of the geographic area; and provide, responsive to the mapping request, the map of the geographic area with the one or more mapping characteristics of the geographic area.

4. The method of claim 1, further comprising:

providing, responsive to an additional mapping request, an additional map of the geographic area, the additional map of the geographic area including a different granularity of display of the point of interest, wherein the geographic area for the additional map defines the same zoom level as the geographic area for the map.

5. The method of claim 4, wherein the additional mapping request is for the user and wherein providing the different granularity of display of the point of interest is based on an additional context of the user at a time of the additional mapping request, the additional context being different from the current context.

6. A computer implemented method, comprising:

receiving a first mapping request for a user at a first time, wherein the first mapping request includes an indication of a geographic area of interest;

determining a geographic area for the first mapping request based at least in part on the indication of the geographic area of interest in the first mapping request;

identifying a first context of the user for the first mapping request, wherein the first context is determined based at least in part on one or more first documents sent to the user from a first source, is indicative of a first state of one or more dynamic states associated with the user, is in addition to a location of the user at the first time, and includes a first context attribute that indicates a first date range for the first context, wherein identifying the first context of the user for the first mapping request comprises:

determining the first context based on receiving the first mapping request during the first date range;

providing, responsive to the first mapping request, a first map that includes the geographic area and that includes one or more first mapping characteristics that are determined based on the first context of the user;

receiving a second mapping request for the user at a second time, wherein the second mapping request includes the indication of the geographic area of interest;

determining the geographic area for the second mapping request based at least in part on the indication of the geographic area of interest in the second mapping request;

identifying a second context of the user for the second mapping request, wherein the second context is distinct from the first context, is determined based at least in part on one or more second documents sent to the user from a second source, is indicative of a second state of one or more of the dynamic states associated with the user, is in addition to a location of the user at the second time, and includes a second context attribute that indicates a second date range for the second context, wherein identifying the first context of the user for the first mapping request comprises determining the second context based on receiving the second mapping request during the second date range;

providing, responsive to the second mapping request, a second map that includes the geographic area and that includes one or more second mapping characteristics that are determined based on the second context of the user, the second mapping characteristics being distinct from the first mapping characteristics.

7. The method of claim 1, wherein the document sent to the user is an email sent to the user.

8. The method of claim 1, wherein determining the granularity of display of the point of interest based on the current context comprises determining a display prominence of the point of interest.

9. The system of claim 2, wherein the instructions further comprise instructions to:
   provide, responsive to an additional mapping request, an additional map of the geographic area, the additional map of the geographic area including a different granularity of display of the point of interest, wherein the geographic area for the additional map defines the same zoom level as the geographic area for the map.

10. The system of claim 9, wherein the additional mapping request is for the user and wherein the instructions to provide the different granularity of display of the point of interest is based on an additional context of the user at a time of the additional mapping request, the additional context being different from the current context.

11. The system of claim 2, wherein the document sent to the user is a message sent to the user.

12. The system of claim 2, wherein the instructions to determine the granularity of display of the point of interest based on the current context include instructions to determine a display prominence of the point of interest.

* * * * *